US011477215B2

United States Patent
Colvin et al.

(10) Patent No.: US 11,477,215 B2
(45) Date of Patent: Oct. 18, 2022

(54) SCALING A PROCESSING RESOURCE OF A SECURITY INFORMATION AND EVENT MANAGEMENT SYSTEM

(71) Applicant: International Business Machines Corporation, Armonk, NY (US)

(72) Inventors: John Colvin, Carrickfergus (GB); Catherine Paul, Belfast (GB); Sean Patrick Cullen, Belfast (GB); Joe McErlean, Portglenone (GB)

(73) Assignee: International Business Machines Corporation, Armonk, NY (US)

(*) Notice: Subject to any disclaimer, the term of this patent is extended or adjusted under 35 U.S.C. 154(b) by 309 days.

(21) Appl. No.: 16/817,879

(22) Filed: Mar. 13, 2020

(65) Prior Publication Data

US 2021/0288979 A1 Sep. 16, 2021

(51) Int. Cl.
*H04L 9/40* (2022.01)
*G06F 21/57* (2013.01)
*G06F 9/54* (2006.01)

(52) U.S. Cl.
CPC .......... *H04L 63/1416* (2013.01); *G06F 9/542* (2013.01); *G06F 21/577* (2013.01); *H04L 63/1425* (2013.01); *H04L 63/1433* (2013.01); *H04L 63/20* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,926,099 B1 | 4/2011 | Chakravarty et al. | |
| 8,661,456 B2 | 2/2014 | Wang et al. | |
| 10,050,999 B1* | 8/2018 | Rossman | H04L 63/1416 |
| 11,050,778 B2* | 6/2021 | Paturi | G06F 21/54 |
| 11,233,823 B1* | 1/2022 | Venkataramani | H04L 63/1491 |
| 2017/0118244 A1 | 4/2017 | Bai et al. | |
| 2017/0373940 A1 | 12/2017 | Shahab et al. | |
| 2018/0336351 A1* | 11/2018 | Jeffries | G06F 21/566 |
| 2019/0020665 A1* | 1/2019 | Surcouf | H04L 67/10 |

(Continued)

FOREIGN PATENT DOCUMENTS

CN 106209826 A 12/2016

OTHER PUBLICATIONS

Amazon, "Scheduling Scaling for Amazon EC2 Auto Scaling," https://docs.aws.amazon.com/autoscaling/ec2/userguide/schedule_time.html, printed Feb. 24, 2020, 3 pgs.

(Continued)

*Primary Examiner* — Joseph P Hirl
*Assistant Examiner* — Hassan Saadoun
(74) *Attorney, Agent, or Firm* — Peter K. Suchecki (57) ABSTRACT

Concepts for scaling a processing resource of a security information and event management system for processing a set of security events are presented. One example comprises identifying an event property of a set of security events, then assessing the identified event property against a predetermined rule. The method then comprises, in response to the assessed event property satisfying the predetermined rule, scaling a processing resource for processing the set of security events based on the predetermined rule.

20 Claims, 5 Drawing Sheets

(56) References Cited

U.S. PATENT DOCUMENTS

2021/0320817 A1* 10/2021 Janakiraman .......... H04L 45/22

OTHER PUBLICATIONS

GITHUB, "mbogus/kube-amqp-autoscale," https://github.com/mbogus/kube-amqp-autoscale, printed Feb. 24, 2020, 4 pgs.
Jacobson et al., "Scryer: Netflix's Predictive Auto Scaling Engine," https://medium.com/netflix-techblog/scryer-netflixs-predictive-auto-scaling-engine-a3f8fc922270, printed Feb. 24, 2020, 5 pgs.
Microsoft, "Get started with autoscale in Azure—Azure Monitor," https://docs.microsoft.com/en-us/azure/monitoring-and-diagnostics/monitoring-autoscale-get-started?toc=/azure/azure-monitor/toc.json#scale-based-on-a-schedule, printed Feb. 24, 2020, 27 pgs.
Wikipedia, "Autoscaling," https://en.wikipedia org/wiki/Autoscaling#Alternative_autoscaling_decision , printed Feb. 24, 2020, 6 pgs.

* cited by examiner

SCALING A PROCESSING RESOURCE OF A SECURITY INFORMATION AND EVENT MANAGEMENT SYSTEM

BACKGROUND

The present disclosure relates generally to security information and event management systems, and more particularly to scaling a processing resource of a security information and event management system for processing a set of security events.

Traditional Security Information and Event Management (SIEM) systems are software products or services that provide real-time analysis of security alerts generated by applications and network hardware. SIEM systems aggregate and analyze activity from multiple resources across an entire IT infrastructure. A traditional SIEM system collects security data from network devices, servers, and/or domain controllers, and is used to log security data and generate reports for compliance purposes. Container orchestration platforms (e.g., clusters) are a set of tools for managing the lifecycles of software containers, especially in large, dynamic environments.

SUMMARY

According to an aspect of the present disclosure, there is provided a computer-implemented method. The method comprises identifying an event property of a set of security events, then assessing the identified event property against a predetermined rule. The method then comprises, in response to the assessed event property satisfying the predetermined rule, scaling a processing resource for processing the set of security events based on the predetermined rule.

According to yet another aspect of the disclosure, there is provided a system for scaling a processing resource of a security information and event management system for processing a set of security events. The system comprises an identifying unit configured to identify an event property of a set of security events. The system further comprises an assessing unit configured to assess the identified event property against a predetermined rule and a scaling unit configured to, in response to the assessed event property satisfying the predetermined rule, scale a processing resource for processing the set of security events based on the predetermined rule.

According to another aspect of the disclosure, there is provided a computer program product for scaling a processing resource of a security information and event management system for processing a set of security events. The computer program product comprises a computer readable storage medium having program instructions embodied therewith, the program instructions executable by a processing unit to cause the processing unit to perform a method according to a proposed embodiment.

According to another aspect of the disclosure, there is provided a processing system comprising at least one processor and the computer program product according to an embodiment. The at least one processor is adapted to execute the computer program code of said computer program product.

The above summary is not intended to describe each illustrated embodiment or every implementation of the present disclosure

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Embodiments of the present disclosure will now be described, by way of example only, with reference to the following drawings, in which.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of security information and event management systems, and more particularly to scaling a processing resource of a security information and event management system (SIEM) for processing a set of security events. While the present disclosure is not necessarily limited to such applications, various aspects of the disclosure may be appreciated through a discussion of various examples using this context.

It should be understood that the Figures are merely schematic and are not drawn to scale. It should also be understood that the same reference numerals are used throughout the Figures to indicate the same or similar parts.

In the context of the present application, where embodiments of the present disclosure constitute a method, it should be understood that such a method may be a process for execution by a computer, i.e., may be a computer-implementable method. The various steps of the method may therefore reflect various parts of a computer program, e.g., various parts of one or more algorithms.

Also, in the context of the present application, a system may be a single device or a collection of distributed devices that are adapted to execute one or more embodiments of the methods of the present disclosure. For instance, a system may be a personal computer (PC), a server, or a collection of PCs and/or servers connected via a network such as a local area network, the Internet and so on to cooperatively execute at least one embodiment of the methods of the present disclosure.

Embodiments of the present disclosure provide a computer-implemented method for scaling a processing resource of a security information and event management system for processing a set of security events. Additional embodiments of the present disclosure also relate to a computer program product comprising computer-readable program code that enables a processor of a system, or a number of processors of a network, to implement such a method. Further embodiments of the present disclosure relate to a computer system comprising at least one processor and such a computer program product, wherein the at least one processor is adapted to execute the computer-readable program code of said computer program product. Embodiments of the present disclosure also seek to provide a processing system adapted to execute this computer program code.

Some embodiments of the present disclosure provide a system for scaling a processing resource of a security information and event management (SIEM) system for processing a set of security events.

Traditional SIEM systems are software products or services that provide real-time analysis of security alerts generated by applications and network hardware. SIEM systems aggregate and analyse activity from multiple different resources across an entire IT infrastructure. A traditional SIEM system collects security data from network devices, servers, and/or domain controllers, and is used to log security data and generate reports for compliance purposes. Container orchestration platforms (i.e. clusters) are a set of tools for managing the lifecycles of software containers, especially in large, dynamic environments.

Running a traditional SIEM system on a container orchestration platform can result in a fundamental problem. It is typically difficult to predict when a large volume of security events can be expected; therefore, there may be a risk of insufficient appropriate processing infrastructure available for analysing and correlating the security events. A security event is a change in the everyday operations of a network or information technology service indicating that a security policy may have been violated or a security safeguard may have failed. The lack of available appropriate processing infrastructure can result in a large backlog of security events that are not being processed at a high enough rate, and as such there is a higher risk that security analysts will not get notified of security related anomalies or breaches with the required expediency. Consequently, remediation actions appropriate to the security events may not be implemented quickly enough as key security events are stuck in the security event backlog and are not able to be analysed and correlated fully by the SIEM system.

For example, a SIEM system may suffer a distributed denial-of-service (DDOS) attack when the SIEM security event backlog is flooded with security events in such a way that there is not enough processing infrastructure in place to deal with the backlog. In another example, within a specific geographical area, at the start of a typical business day, a large volume of users are logging into their respective workstations. This can result in an increased amount of login security events; therefore, more security event processing infrastructure is required.

Concepts for scaling a processing resource of a SIEM system for processing a set of security events are proposed. Such concepts may enable scaling (e.g., decreasing, increasing, or reallocating) a processing resource of a SIEM system by analyzing one or more event properties of security events received by the SIEM system. Accordingly, embodiments may facilitate rule-driven automatic scaling of a security event processing orchestration platform.

Such concepts may involve analyzing patterns and/or types of security events to determine whether more/less processing infrastructure (e.g., processing resource) is required. The SIEM system may be rules-based and/or may employ a correlation engine to establish the relationship between security event log entries. Appropriate remediation actions may be implemented in response to anomalies being detected, such as notifying a security analyst that something unusual is happening (e.g., a security breach is occurring).

Embodiments may be implemented in conjunction with a container-based orchestrations platform (e.g., a cluster) in a multi-tenanted mode. Each tenant may be allocated a "namespace" in the underlying platform. A namespace in this context may mean that each tenant may have a virtual cluster running on an overarching shared instance. Each tenant may be fully isolated and may individually have a certain level of cluster resources (e.g., processing resource) assigned to them.

Embodiments may further be implemented in conjunction with a concept of pre-emptively scaling up/down a processing resource for a given tenant in a container-based orchestration platform in response to certain predetermined rules being met when analyzing and correlating security events. In this context, a rule may be a collection or set of tests that may trigger a remediation action when specific conditions are met by the one or more event properties of the security events. A rule may be configured to capture and respond to a specific security event, a sequence (e.g., a pattern) of security events, or when a security offense is created.

Proposed embodiments may employ a concept of implementing rules to test against security event data, event flow data, or security offenses. Rules may outline and evaluate incoming data (e.g., security events) against predefined test conditions in order to generate a response from the SIEM system. When the conditions of a rule are met, a response to the rule may be generated and/or invoked.

Accordingly, the inventors propose the provision of a security event pipeline running on the SIEM system, which processes the security events by way of a high-level flow. The platform running the security event pipeline on the container-based orchestration platform may be designed using a publish/subscribe model. In software architecture, a publish/subscribe model is a messaging pattern where senders of messages, called publishers, do not program the messages to be sent directly to specific receivers, called subscribers, but instead categorize published messages into classes without knowledge of which subscribers, if any, there may be. The security event pipeline may comprise various stages of processing, including an Event Ingress stage, an Event Collection stage, an Event Processing stage, and an Offense Generation stage. Between each stage, the set of security events may be published to a message bus where consumers may subscribe to pull the security events. Each of the stages in the security event pipeline may run the processing resource (e.g., various process components) deployed as containers, which may be scaled up/down in response to an assessed event property of the set of security events satisfying a predetermined rule (e.g., one or more assessed event properties). The processing resource may be scaled within a desired tenant namespace to achieve an increased event throughput.

In a proposed embodiment, the processing resource may serve at least one tenant, wherein each of the at least one tenant may be assigned a quantity (e.g., a share, portion, quota or allocation) of the processing resource. In this way, the processing resource may be pre-emptively prepared for increased/decreased use by a given tenant of the at least one tenant, instead of requiring to scale all of the processing resource used by all tenants. This may improve the efficiency of scaling the processing resource by reducing the unnecessary scaling of processing resource assigned to a given tenant that may not be affected by the set of security events.

In some embodiments, scaling the processing resource may comprise scaling the quantity of the processing resource assigned to each of the at least one tenant affected by the set of security events. In this way, a quantity of the processing resource assigned to a given tenant of the at least one tenant may be pre-emptively scaled up/down (i.e. controlled) based on a predetermined rule being satisfied by the set of security events. As a result, the flexibility of scaling the processing resource (e.g., cluster scaling) may be improved, which may improve the efficiency of controlling and using the processing resource.

In a proposed embodiment, a security event of the set of security events may comprise a change in regular operations of the SIEM system, wherein the change may indicate that a security policy has been violated and/or a security safeguard has failed. In this way, the speed and efficiency of reacting to an identified security policy violation and/or a security safeguard failure may be improved. This may enable optimizing the act of remediation in response to identifying the security policy violation and/or a security safeguard failure by pre-emptively scaling the affected processing resource.

In some embodiments, the event property may comprise at least one of an event pattern of the set of security events, an event quantity of the set of security events, an event type of each of the set of security events, and a rate of receiving the set of security events. In this way, the processing resource may be scaled in response to an event pattern identified in the set of security events, a change in volume (or a specific volume) identified in the set of security events, a change in speed (or a specific speed) of receiving the set of security events, and/or an event type identified in the set of security events. This may increase the flexibility in pre-emptively and automatically scaling the processing resource to be improved, consequently optimizing cluster (e.g., processing resource) utilization for each tenant. As a result, a "pay what you use" deployment model may be implemented when using the processing resource, where a tenant is charged based on their processing resource usage. Consequently, the overall costs of implementing the processing resource are reduced.

In some embodiments, the predetermined rule may comprise one or more predetermined tests that may be satisfied in response to a specific condition being met by the set of security events. In this way, the speed of processing and correlating the set of security events may be improved, which may optimise the efficiency of scaling the processing resource in response to assessing the event property of the set of security events against the predetermined rule. Further, the control of the specific condition(s) of the event property of the set of security events that triggers a pre-emptive scaling of the processing resource may be optimised, which may improve the control and efficiency of scaling the processing resource.

In some embodiments, identifying an event property of a set of a security events may comprise receiving the set of security events, processing each of the set of security events, and identifying the event property of each of the set of processed security events. In this way, the one or more event properties of the set of security events may be monitored more with improved efficiency, enabling the control of scaling the processing resource to be optimized.

In a proposed embodiment, scaling the processing resource for processing the set of security events based on the predetermined rule may comprise generating a response to the satisfied predetermined rule and scaling the quantity of the processing resource for processing the set of security events based on the generated response. In this way, the generated response may be tailored to the specific predetermined rule that was satisfied, which may improve the efficiency in triggering an appropriate remediation action in response to the event property satisfying the predetermined rule. As a result, the control of scaling the processing resource may be optimized.

In some embodiments, generating the response may comprise at least one of generating a security offense alert, sending a notification, performing vulnerability scans, and performing a predetermined rule action. In this way, a potential security breach may be responded to more quickly and efficiently, using the most appropriate remediation action. As a result, a relevant user (e.g., a Security Operation Center (SOC) Analyst may be notified quicker of an identified potential security breach).

Figure 1:
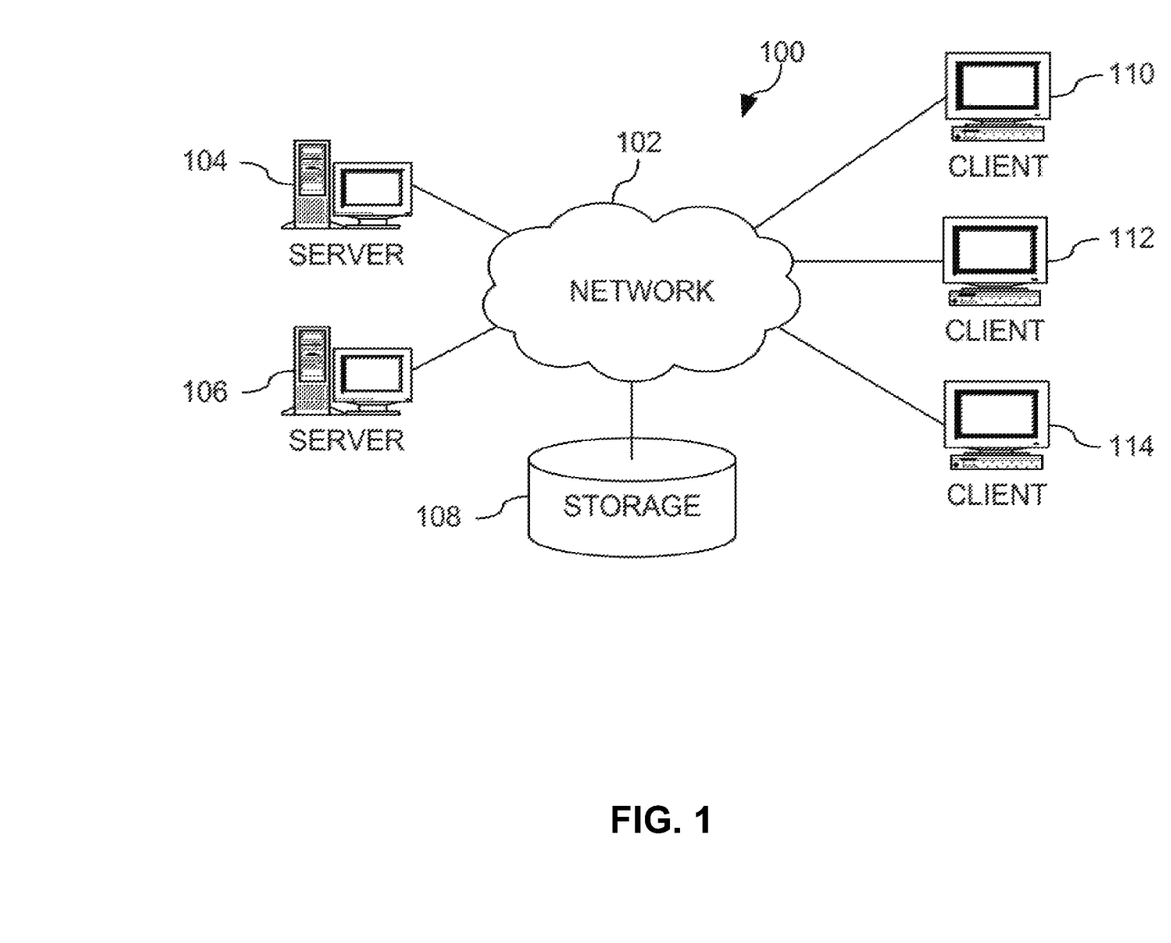
FIG. 1 depicts a pictorial representation of an example distributed system in which aspects of the illustrative embodiments may be implemented.

Referring now to FIG. 1, depicted is a pictorial representation of an exemplary distributed system 100 in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed system 100. The network 102 may include connections, such as wire, wireless communication links, or fiber optic cables.

In the depicted example, a first sever 104 and a second server 106 are connected to the network 102 along with a storage unit 108. In addition, client 110, client 112, and client 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

Figure 2:
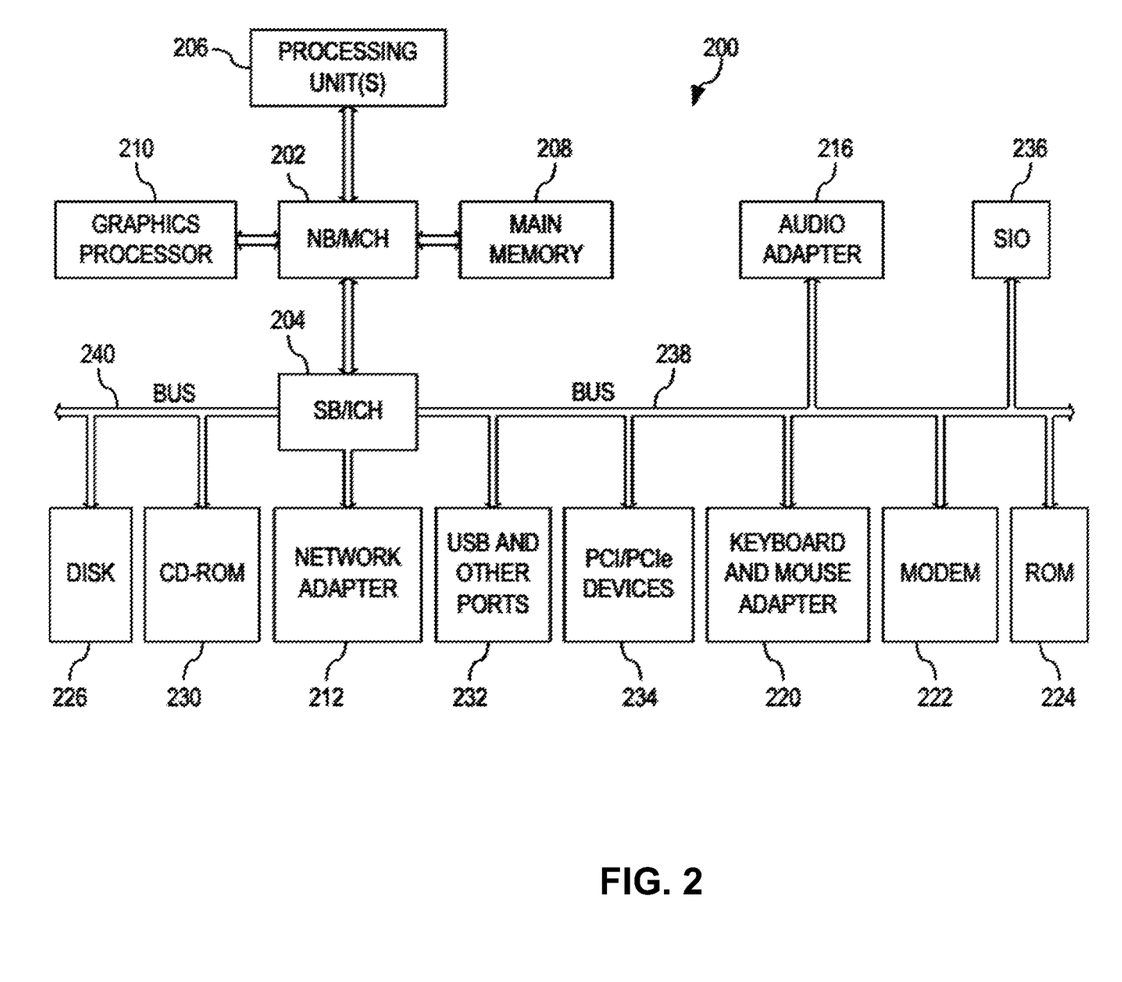
FIG. 2 is a block diagram of an example system in which aspects of the illustrative embodiments may be implemented.

Referring now to FIG. 2, shown is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present disclosure may be located. For instance, the system 200 may be configured to implement an identifying unit, an associating unit, and a creating unit according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present disclosure may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
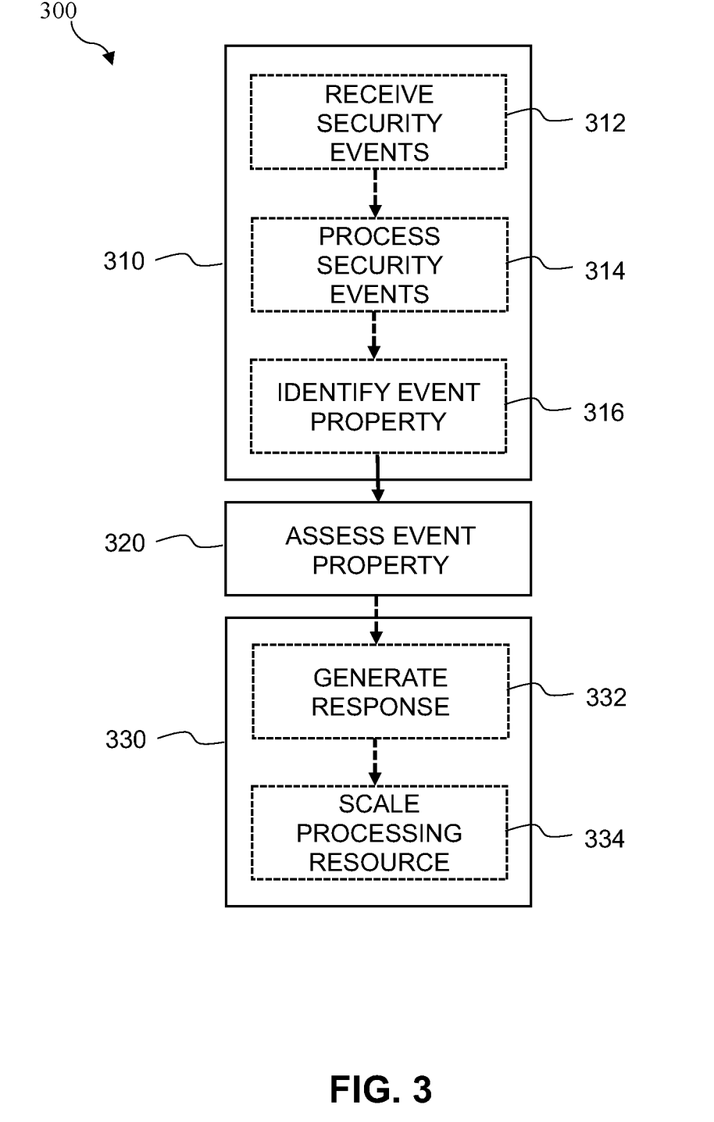
FIG. 3 is a flow diagram of a computer-implemented method for scaling a processing resource of a security information and event management system for processing a set of security events.

Referring now to FIG. 3, there is depicted a flow diagram of a computer-implemented method 300 for scaling a processing resource of a security information and event management (SIEM) system for processing a set of security events.

Step 310 comprises identifying one or more event properties of a set of security events.

In an embodiment, a security event of the set of security events comprises a change in regular operations of the SIEM system, wherein the change indicates that a security policy has been violated and/or a security safeguard has failed. For example, the SIEM system may determine that the amount of login security events are increasing (e.g., due to user logging into their workstations), therefore more processing resource is required to pre-emptively support the increase.

In an embodiment, step 310 comprises steps 312, 314, and 316. Step 312 comprises receiving the set of security events. Step 314 comprises processing each of the set of security events. Step 316 comprises identifying the one or more event properties of each of the set of processed security events. For example, security events are collected and pushed to an upstream message bus in an Event Collection stage of a security event pipeline. The security events are pushed by way of tenant security event processing components. Consequently, the message bus has a backlog of security events, which are processed in a first-in, first-out (FIFO) order.

In an embodiment, the one or more event properties comprises at least one of an event pattern of the set of security events, an event quantity of the set of security events, an event type of each of the set of security events, and a rate of receiving the set of security events. For example, a plurality of event properties of a set of security events are identified.

Step 320 comprises assessing the one or more identified event properties against a predetermined rule.

In an embodiment, the predetermined rule comprises one or more predetermined tests that are satisfied in response to a specific condition being met by the set of security events. For example, a predetermined rule (e.g., a configured rule) is evaluated while the security events are processed. The rule is used to indicate that the volume of security events is likely to increase/decrease. The evaluation of the predetermined rule determines whether one or more identified event properties of a security event satisfies the predetermined rule. In the example, the rule indicates that an increase of security events is expected. In another example, the rule indicates that a decrease of security events is expected.

In an example, the predetermined rule is configured to check a security event (or security events) of a given security event type have been received and/or identified and trigger an appropriate action in response to receiving and/or identifying the security event of the given security event type. In another example, the predetermined rule is configured to trigger a remediation action in response to detecting a security event from a distributed denial-of-service (DDOS) protection system, indicating that a DDOS attack is becoming active. In yet another example, the predetermined rule is configured to monitor the amount of security event traffic over a time period and trigger an appropriate remediation action in response to a change in the amount of security event traffic occurring. In yet another example, a first predetermined rule, rule A, is configured to trigger an action when there is a noticeable increase of a given type of security event over a predefined time period. A second predetermined rule, rule B, is configured to trigger an action when there is a drop in the number of security events of a given type over a time period. As a result, a custom rule action script is invoked when rule A is met that scales up the processing resource and conversely a custom rule action script is invoked when rule B is met that scales down the processing resource.

Step 330 comprises, in response to the one or more assessed event properties satisfying the predetermined rule, scaling a processing resource for processing the set of security events based on the predetermined rule.

In an embodiment, step 330 comprises steps 332 and 334. Step 332 comprises generating a response to the satisfied predetermined rule. Step 334 comprises scaling the quantity of the processing resource for processing the set of security events based on the generated response. For example, the processing resource for processing the set of security events is a resource responsible for processing the set of security events. In another example, a custom rule action script is invoked in response to a rule being satisfied by one or more identified event properties. As a result, the custom rule action script is run and a corresponding rule action message with all relevant rule contextual data is added to a rule action message bus. The custom rule action script is consumed, and a configured script is invoked (for example, a Python, Perl, or Bash script). In the example, the rule is configured to run a script that invokes a Cluster Application Processing Interface (API) to scale the cluster up in response to identifying an expected increase of security events and to scale the cluster down in response to identifying an expected decrease of security events. Consequently, a processing resource (e.g., processing components) for each tenant is scaled up in response to the Cluster API being invoked to scale the cluster up and scaled down in response to the Cluster API being invoked to scale the cluster down.

In an embodiment, generating the response (step 332) comprises at least one of generating a security offense alert, sending a notification, performing vulnerability scans, and performing a predetermined rule action. In the example where the predetermined rule is configured to trigger a remediation action in response to detecting a security event from a distributed denial-of-service (DDOS) protection system, the generated response comprises using a custom action script to scale up the processing resource, in response to predicting an imminent increase of security event.

In an embodiment, the processing resource serves at least one tenant, wherein each of the at least one tenant is assigned a quantity of the processing resource. For example, the processing resource serves one tenant, two tenants, three tenants, or more than three tenants.

In an embodiment, scaling the processing resource comprises scaling the quantity of the processing resource assigned to each of the at least one tenant affected by the set of security events.

Figure 4:
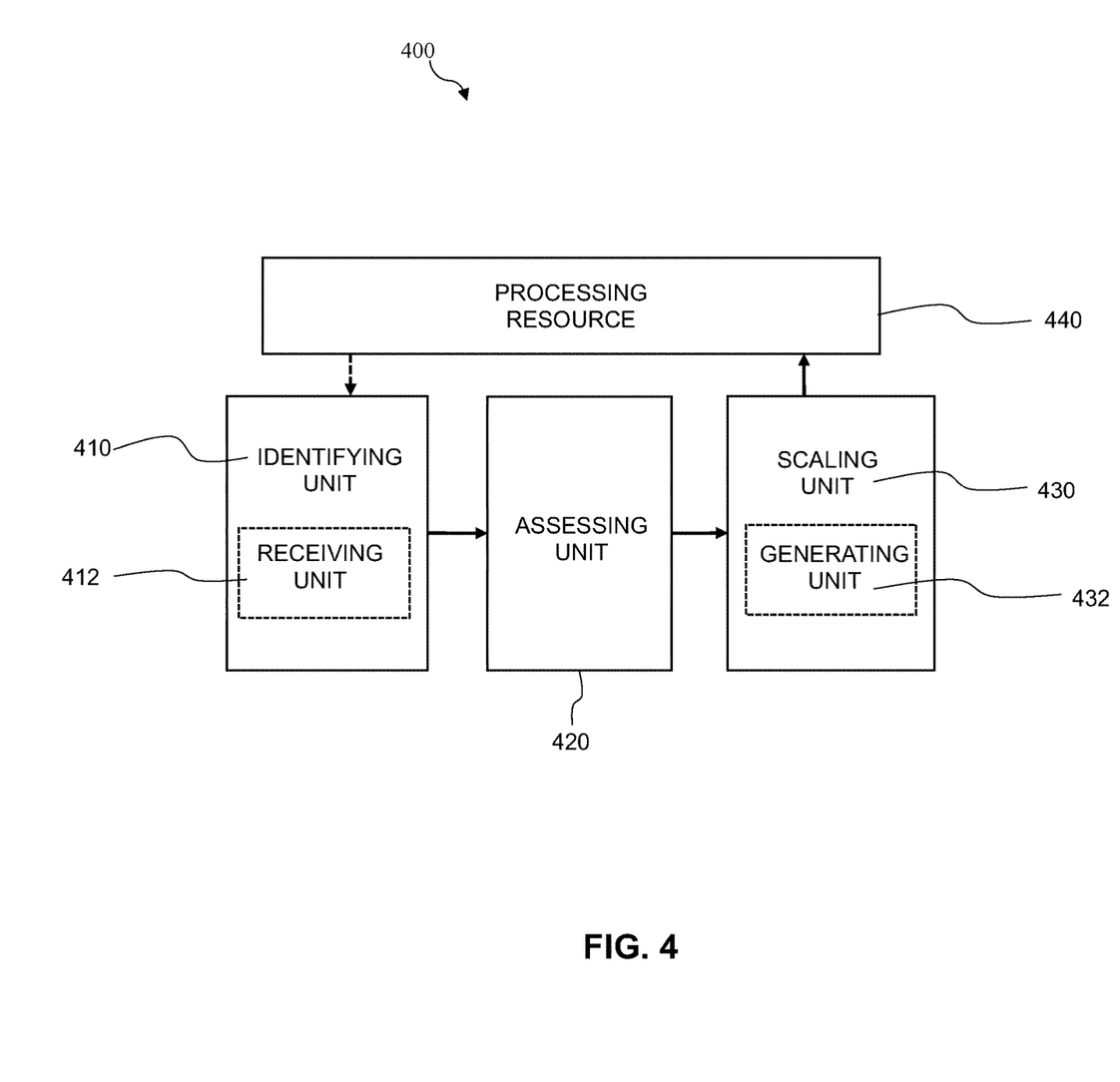
FIG. 4 is a simplified block diagram of an exemplary embodiment of a system for scaling a processing resource of a security information and event management system for processing a set of security events.

Referring now to FIG. 4, there is depicted a simplified block diagram of an exemplary embodiment of a system 400 for scaling a processing resource of a security information and event management system for processing a set of security events.

The system 400 comprises an identifying unit 410 configured to identify one or more event properties of a set of security events. The system 400 further comprises an assessing unit 420 configured to assess the one or more identified event properties against a predetermined rule. The system 400 further comprises a scaling unit 430 configured to, in response to the one or more assessed event properties satisfying the predetermined rule, scale a processing resource 440 for processing the set of security events based on the predetermined rule.

In an embodiment, the identifying unit 410 comprises a receiving unit 412 configured to receive the set of security events, wherein the processing resource 440 is configured to process each of the set of security events. The identifying unit 410 is further configured to identify the one or more event properties of each of the set of processed security events.

In an embodiment, the processing resource 440 serves at least two tenants, wherein each of the at least two tenants is assigned a quantity of the processing resource 440.

In an embodiment, the scaling unit 430 is further configured to, in response to the one or more assessed event properties satisfying the predetermined rule, scale the quantity of the processing resource 440 assigned to each of the at least two tenants affected by the set of security events.

In an embodiment, the scaling unit 430 comprises a generating unit 432 configured to generate a response to the satisfied predetermined rule, wherein the scaling unit 430 is further configured to scale the quantity of the processing resource 440 for processing the set of security events based on the generated response.

In an embodiment, the generating unit 432 is further configured to generate a security offense alert, send a notification, perform vulnerability scans, and/or perform a predetermined rule action.

In an embodiment, a security event of the set of security events comprises a change in regular operations of the security information and event management system, wherein the change indicates that a security policy has been violated and/or a security safeguard has failed.

In an embodiment, the one or more event properties comprises at least one of an event pattern of the set of security events, an event quantity of the set of security events, and an event type of each of the set of security events.

In an embodiment, the predetermined rule comprises one or more predetermined tests that are satisfied in response to a specific condition being met by the set of security events.

Figure 5:
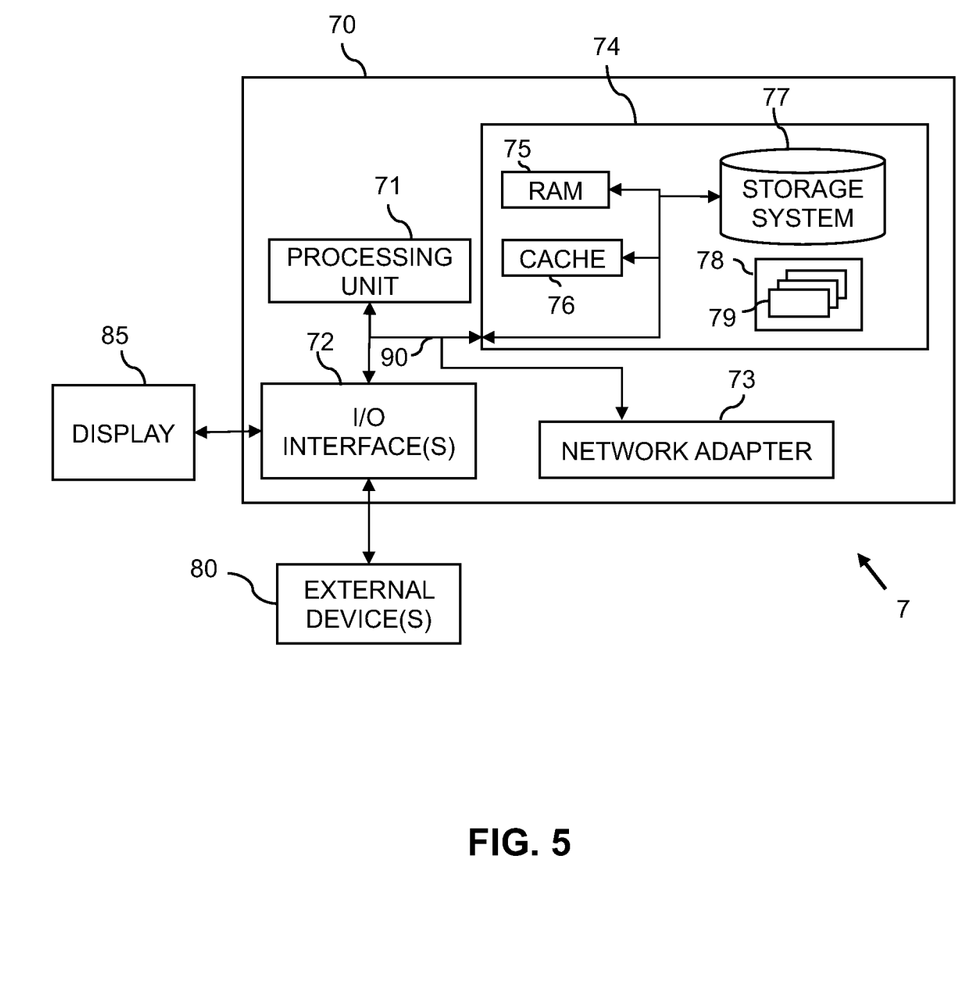
FIG. 5 is a block diagram of an example system in which aspects of the illustrative embodiments may be implemented.

By way of further example, as illustrated in FIG. 5, embodiments may comprise a computer system 70, which may form part of a networked system 7. For instance, an identifying unit may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random-access memory (RAM) 75 and/or cache memory 76. Computer system/server 70 may further include other removable/non-removable, volatile/non-volatile computer system storage media, such as store system 77. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform a method for scaling a processing resource of a security information and event management system for processing a set of security events.

Program/utility 78, having a set (at least one) of program modules 79, may be stored in memory 74. Program modules 79 generally carry out the functions and/or methodologies of proposed embodiments for scaling a processing resource of a security information and event management system for processing a set of security events.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present disclosure constitute a method, it should be understood that such a method is a process for execution by a computer, e.g., is a computer-implementable method. The various steps of the method therefore reflect various parts of a computer program, e.g. various parts of one or more algorithms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for scaling a processing resource of a security information and event management system for processing a set of security events, the method comprising:
   receiving a set of security events from a security event pipeline of a container-based orchestration platform in a multi-tenanted mode;
   analyzing the set of security events;
   identifying, based on the analyzing, one or more event properties of the set of security events;
   assessing the one or more identified event properties against a predetermined rule; and
   in response to the one or more assessed event properties satisfying the predetermined rule, scaling a processing resource for processing the set of security events based on the predetermined rule.

2. The method of claim 1, wherein the processing resource serves at least one tenant, wherein each of the at least one tenant is assigned a quantity of the processing resource.

3. The method of claim 2, wherein scaling the processing resource comprises scaling the quantity of the processing resource assigned to each of the at least one tenant affected by the set of security events.

4. The method of claim 1, wherein a first security event of the set of security events comprises a change in regular operations of the security information and event management system, wherein the change indicates that a security policy has been violated and/or a security safeguard has failed.

5. The method of claim 1, wherein the one or more event properties comprise at least one of:
   an event pattern of the set of security events;
   an event quantity of the set of security events;
   an event type of each of the set of security events; and
   a rate of receiving the set of security events.

6. The method of claim 1, wherein the predetermined rule comprises one or more predetermined tests that are satisfied in response to a specific condition being met by the set of security events.

7. The method of claim 1, wherein scaling the processing resource for processing the set of security events based on the predetermined rule comprises:
   generating a response to the satisfied predetermined rule; and
   scaling the quantity of the processing resource for processing the set of security events based on the generated response.

8. The method of claim 7, wherein generating the response comprises at least one of:
   generating a security offense alert;
   sending a notification;
   performing vulnerability scans; and
   performing a predetermined rule action.

9. A computer program product for scaling a processing resource of a security information and event management system for processing a set of security events, the computer program product comprising a computer readable storage medium having program instructions embodied therewith, the program instructions executable by a processing unit to cause the processing unit to perform a method comprising:
   receiving a set of security events from a security event pipeline of a container-based orchestration platform in a multi-tenanted mode;
   analyzing the set of security events;
   identifying, based on the analyzing, one or more event properties of the set of security events;
   assessing the one or more identified event properties against a predetermined rule; and
   in response to the one or more assessed event properties satisfying the predetermined rule, scaling a processing resource for processing the set of security events based on the predetermined rule.

10. The computer program product of claim 9, wherein the processing resource serves at least one tenant, wherein each of the at least one tenant is assigned a quantity of the processing resource.

11. The computer program product of claim 10, wherein scaling the processing resource comprises scaling the quantity of the processing resource assigned to each of the at least one tenant affected by the set of security events.

12. The computer program product of claim 9, wherein the one or more event properties comprise at least one of:
   an event pattern of the set of security events;
   an event quantity of the set of security events;
   an event type of each of the set of security events; and
   a rate of receiving the set of security events.

13. A system for scaling a processing resource of a security information and event management system for processing a set of security events, the system comprising:
   a receiving unit configured to receive a set of security events from a security event pipeline of a container-based orchestration platform in a multi-tenanted mode;
   an identifying unit configured to identify one or more event properties of the set of security events;
   an assessing unit configured to assess the one or more identified event properties against a predetermined rule; and
   a scaling unit configured to, in response to the one or more assessed event properties satisfying the predetermined rule, scale a processing resource for processing the set of security events based on the predetermined rule.

14. The system of claim 13, wherein the processing resource serves at least two tenants, wherein each of the at least two tenants is assigned a quantity of the processing resource.

15. The system of claim 14, wherein the scaling unit is further configured to, in response to the assessed event property satisfying the predetermined rule, scale the quantity of the processing resource assigned to each of the at least two tenants affected by the set of security events.

16. The method of claim 1, wherein the security event pipeline uses a publish/subscribe model.

17. The method of claim 16, wherein the security event pipeline comprises a plurality of processing stages.

18. The method of claim 17, wherein between each processing stage of the plurality of processing stages the set of security events are published to a message bus.

19. The method of claim 18, wherein a user can receive the published set of security events from the message bus.

20. The method of claim 17, wherein each processing stage of the plurality of processing stages runs the processing resource deployed as one or more containers.

* * * * *